United States Patent
Lynn et al.

(10) Patent No.: US 8,732,701 B2
(45) Date of Patent: May 20, 2014

(54) MANAGING PROTECTED AND UNPROTECTED DATA SIMULTANEOUSLY

(75) Inventors: James A. Lynn, Rose Hill, KS (US); Kevin Lindgren, Newton, KS (US)

(73) Assignee: LSI Corporation, San Jose, CA (US)

( * ) Notice: Subject to any disclaimer, the term of this patent is extended or adjusted under 35 U.S.C. 154(b) by 541 days.

(21) Appl. No.: 12/827,364

(22) Filed: Jun. 30, 2010

(65) Prior Publication Data

US 2012/0005669 A1    Jan. 5, 2012

(51) Int. Cl.
 *G06F 9/455*    (2006.01)
(52) U.S. Cl.
 USPC .......................................... 718/1
(58) Field of Classification Search
 None
 See application file for complete search history.

(56) References Cited

U.S. PATENT DOCUMENTS

| | | | |
|---|---|---|---|
| 7,337,285 B2 * | 2/2008 | Tanoue | 711/158 |
| 7,870,317 B2 * | 1/2011 | Suresh | 710/74 |
| 2005/0262568 A1 * | 11/2005 | Hansen et al. | 726/26 |
| 2006/0059226 A1 * | 3/2006 | McConnell et al. | 709/202 |
| 2006/0136619 A1 * | 6/2006 | Edirisooriya et al. | 710/52 |
| 2010/0011114 A1 | 1/2010 | Thomas et al. | |

FOREIGN PATENT DOCUMENTS

WO    WO2005117390    12/2005

OTHER PUBLICATIONS

Satran, et al., iSCSI, IP Storage Working Group, Internet Draft, Dec. 19, 2003, p. 186, retrieved from http://tools.ietf.org/html/draft-ietf-ips-iscsi-20#section-12.11, Jan. 29, 2013.*

* cited by examiner

*Primary Examiner* — H S Sough
*Assistant Examiner* — William C Wood
(74) *Attorney, Agent, or Firm* — Suiter Swantz pc llo

(57) ABSTRACT

A first virtual device is created including every logically addressable unit of a data storage server that utilizes data protection. A second virtual device is created including no logically addressable unit of the data storage server that utilizes data protection. Data transfers are disabled within all command phases of the first virtual device.

21 Claims, 2 Drawing Sheets

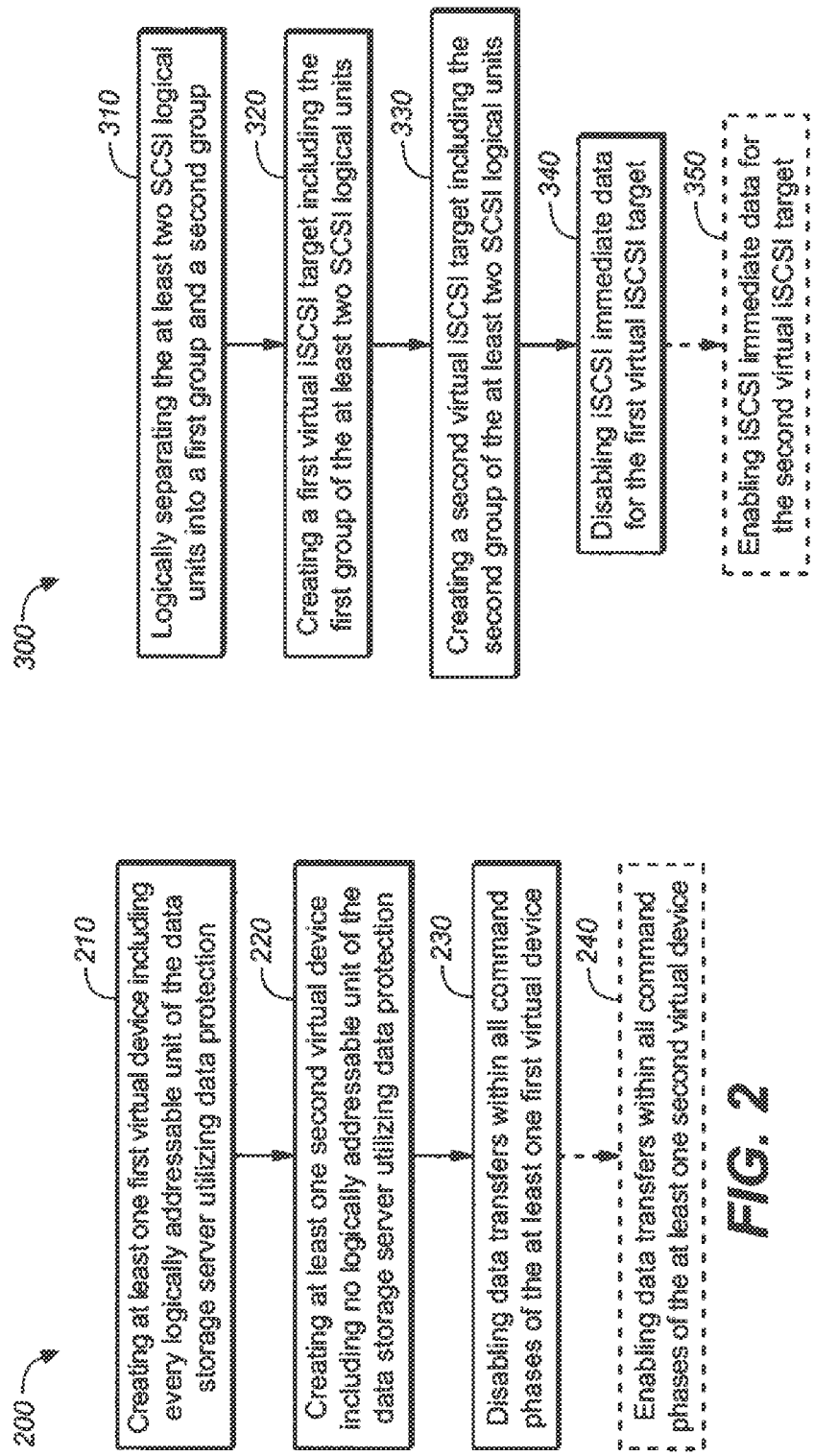

MANAGING PROTECTED AND UNPROTECTED DATA SIMULTANEOUSLY

TECHNICAL FIELD

The present disclosure generally relates to the field of data storage servers, and more particularly to a system and method for configuring a data storage server utilizing virtual targets.

BACKGROUND

Small Computer System Interface (SCSI) is a term referring to various technologies designed to implement data transfer between computer devices. Internet Small Computer System Interface (iSCSI) is a term referring to an internet based networked storage standard which implements SCSI-based commands. Widely varying types of data and data storage units may be utilized in data storage system utilizing such standards. These widely varying types of data and data storage units may require sophisticated data storage server configurations in order to maximize utility.

SUMMARY

A system may include, but is not limited to: means for creating at least one first virtual device including every logically addressable unit of a data storage server that utilizes data protection; means for creating at least one second virtual device including no logically addressable unit of the data storage server that utilizes data protection; and means for disabling data transfers within all command phases of the at least one first virtual device.

A method for configuring a data storage server including at least two logically addressable units, may include, but is not limited to: creating at least one first virtual device including every logically addressable unit of the data storage server that utilizes data protection; creating at least one second virtual device including no logically addressable unit of the data storage server that utilizes data protection; and disabling data transfers within all command phases of the at least one first virtual device.

A method for configuring an iSCSI data storage server including at least two SCSI logical units may include, but is not limited to: logically separating the at least two SCSI logical units into a first group and a second group, wherein the first group of the at least two SCSI logical units utilizes T-10 standard type 2 data protection, and wherein the second group of the at least two SCSI logical units does not utilize T-10 standard type 2 data protection; creating a first virtual iSCSI target including the first group of the at least two SCSI logical units; creating a second virtual iSCSI target including the second group of the at least two SCSI logical units; and disabling iSCSI immediate data for the first virtual iSCSI target.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 2 is a flow diagram illustrating a method for configuring a data storage server; and FIG. 3 is a flow diagram illustrating a method for configuring a data storage server.

DETAILED DESCRIPTION

Figure 1:
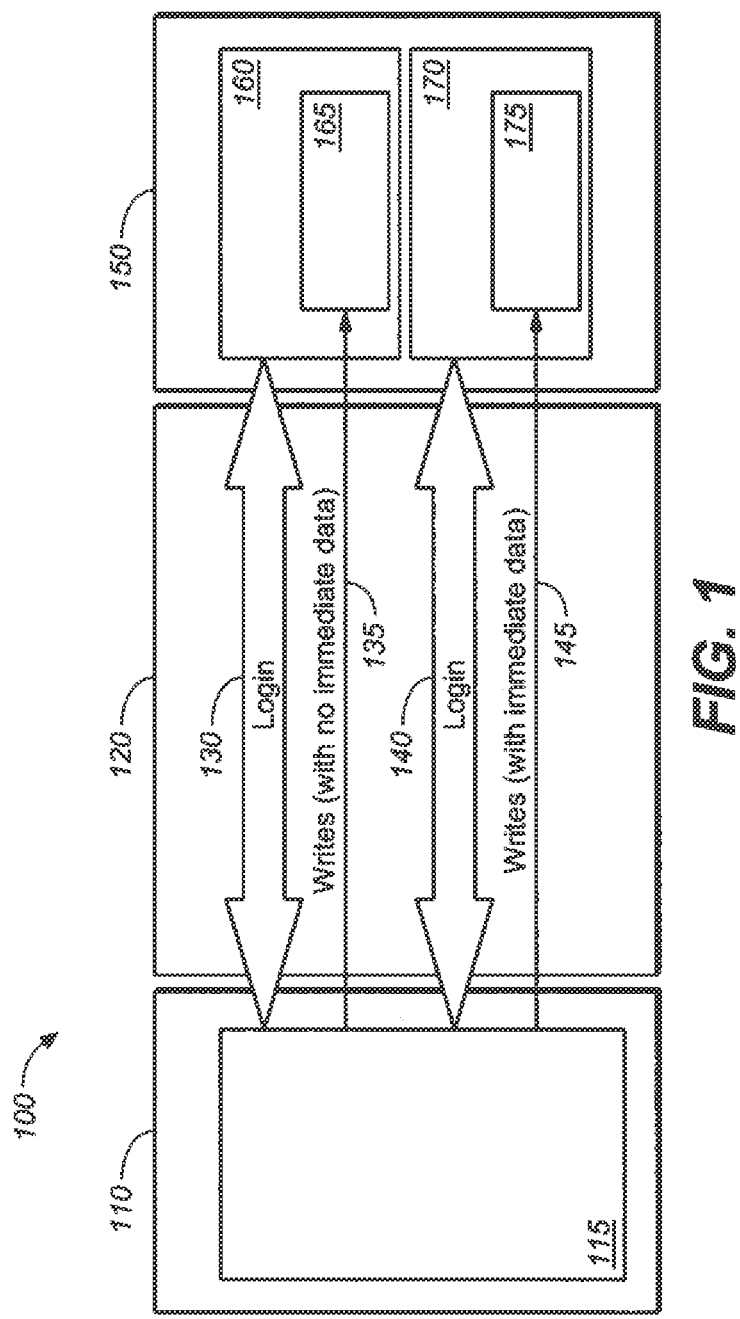
FIG. 1 is a block diagram illustrating a network topology utilizing a data storage server.

Reference will now be made in detail to the subject matter disclosed, which is illustrated in the accompanying drawings.

In computer storage systems, commands may be sent within a pre-defined data structure. For example, in order to perform a data write, a system may send a series of bits representing a data structure including a write command. The system may then send a series of bits representing a data structure including the actual data intended to be written subsequent to sending the write command. In some technologies, data transfers may occur within the command phase, eliminating the requirement for sending and processing a separate data structure including the actual data intended to be written. For example, the iSCSI standard provides for the utilization of immediate data. In an iSCSI computer storage system, the actual data to be written may be included within the iSCSI Command Descriptor Block (CDB) as immediate data, if the data size is sufficiently small.

A network topology featuring a data storage server in accordance with an exemplary embodiment of the present disclosure is shown. The topology 100 may include storage client 110 connected to storage server 150 via network 120. As shown in FIG. 1, network 120 may be an Internet Small Computer System Interface (iSCSI) network, however, other interfaces may be utilized within the context of the current disclosure. Storage client 110 may include means 115 to access network 120. In the case of an iSCSI network, means 115 may be an iSCSI initiator.

Storage server 150 may be configured to implement a plurality of virtual targets 160, 170. As a group, the plurality of virtual targets 160, 170 may contain all logical units of storage server 150. The plurality of virtual targets may include two or more virtual targets. As shown in FIG. 1, logical units 165, 175 are the logical units of storage server 150. Virtual targets 160, 170 may be configured to isolate specific logical units of storage server 150 from other specific logical units of storage server 150. For example, specific logical units of storage server 150 may be isolated because of attributes or potential attributes of the logical units or the virtual targets. Each of the plurality of virtual targets 160, 170 may be configured to contain all logical units of storage server 150 with a particular attribute or potential attribute. In addition, each of the plurality of virtual targets 160, 170 may be configured to contain only logical units of storage server 150 with a particular attribute or potential attribute. Conversely, each of the plurality of virtual targets 160, 170 may be configured to contain all logical units of storage server 150 without a particular attribute or potential attribute. In addition, each of the plurality of virtual targets 160, 170 may be configured to contain only logical units of storage server 150 without a particular attribute or potential attribute. Storage server 150 may be configured to logically separate the logical units of storage server 150 by a particular attribute or potential attribute. Storage server 150 may be configured to create the plurality of virtual targets 160, 170 to include and isolate the logical units of storage server 150. In an embodiment, data protection utilization or a parameter indicative of data protection utilization may be considered an attribute.

Data protection may refer to the technologies utilized to assure data is not lost or corrupted. A common technique utilizes additional data calculated or derived from each data block, and subsequently transferred and stored with each data block. The additional data may be recalculated or derived and checked with the previous additional data at a later time to assure data integrity of the data block. This verification does require additional processing and time for execution. Such a technique is provided as part of the SCSI T10 standard, which provides for a type 1, a type 2, and a type 3 data protection, as well as a type 0 for no data protection.

As shown in FIG. 1, virtual targets 160, 170 may be iSCSI targets. Virtual target 160 may contain logical unit 165 (or LUN 165). Only one logical unit 165 is shown in FIG. 1, however, virtual target 160 may contain more than one logical unit. Logical unit 165 may utilize data protection. For example, the data protection may be T10-standard type 2 data protection. Logical unit 165 may contain an internal parameter indicating it will disallow data transfers within the command phase. For example, logical unit 165 may contain a parameter indicating it will disable utilization of iSCSI immediate data. Alternatively, virtual target 160 may utilize a parameter indicating the logical units contained within virtual target 160 will disable utilization of iSCSI immediate data. In an embodiment, logical unit 165 may represent the only logical units of storage server 150 utilizing data protection.

Virtual target 170 may contain logical unit 175 (or LUN 175). Only one logical unit 175 is shown in FIG. 1, however, virtual target 170 may contain more than one logical unit. Logical unit 175 may not utilize data protection. Logical unit 175 may contain an internal parameter indicating it will allow data transfers within the command phase. For example, logical unit 175 may contain a parameter indicating it will enable utilization of iSCSI immediate data. Alternatively, virtual target 170 may utilize a parameter indicating the logical units contained within virtual target 170 will enable utilization of iSCSI immediate data. In an embodiment, logical unit 175 may represent the only logical units of storage server 150 not utilizing data protection.

iSCSI initiator 115 may be required to create a separate login to access each individual virtual target within storage server 150. As shown in FIG. 1, iSCSI initiator may utilize a login to access iSCSI target 160. During the login negotiation 130, iSCSI target 160 may negotiate with iSCSI initiator 115 to disallow iSCSI immediate data. Subsequent writes 135 to logical unit 165 may not utilize iSCSI immediate data. iSCSI initiator 115 may utilize a login to access iSCSI target 170. During the login negotiation 140, iSCSI target 170 may negotiate with iSCSI initiator 115 to allow iSCSI immediate data. Subsequent writes 145 to logical unit 175 may utilize iSCSI immediate data.

Referring generally to FIG. 2, a method for configuring a data storage server is shown. The method 200 may include the step of creating at least one first virtual device including every logically addressable unit of the data storage server utilizing data protection 210. Further, the first virtual device may include only logically addressable units of the data storage server utilizing data protection. In an embodiment, the first virtual device may be an iSCSI target. Further, the data protection may be T10-standard type 2 data protection.

The method 200 may further include the step of creating at least one second virtual device including no logically addressable unit of the data storage server utilizing data protection 220. For example, the second virtual device may be an iSCSI target. Further, the at least one first virtual device and the at least one second virtual device may each require a separate login for access.

The method 200 may further include the step of disabling data transfers within all command phases of the at least one first virtual device 230. Further, the disabling of data transfers within all command phases may occur during a login negotiation for the at least one first virtual device. For example, the disabling of data transfers may include disabling immediate data support for the at least one first virtual device.

The method 200 may further include the step of enabling data transfers within all command phases of the at least one second virtual device 240. Further, the enabling of data transfers within all command phases may occur during a login negotiation for the at least one second virtual device. For example, the enabling of data transfers may include enabling immediate data support for the at least one second virtual device.

Referring generally to FIG. 3, a method for configuring a data storage server including at least two iSCSI logical units is shown. The method 300 may include the step of logically separating the at least two SCSI logical units into a first group and a second group 310. Further, the first group of the at least two SCSI logical units may utilize T-10 standard type 2 data protection. The second group of the at least two SCSI logical units may not utilize T-10 standard type 2 data protection.

The method 300 may further include the step of creating a first virtual iSCSI target including the first group of the at least two SCSI logical units 320. The method 300 may further include the step of creating a second virtual iSCSI target including the second group of the at least two SCSI logical units 330. Further, the first virtual iSCSI target and the second virtual iSCSI target may each require separate logins for access.

The method 300 may further include the step of disabling iSCSI immediate data for the first virtual iSCSI target 340. Further, the disabling iSCSI immediate data for the first virtual iSCSI target may occur during a login negotiation for the first virtual iSCSI target. The disabling iSCSI immediate data for the first virtual iSCSI target may utilize an internal parameter of the first virtual iSCSI target.

The method 300 may further include the step of enabling iSCSI immediate data for the second virtual iSCSI target 350. Further, the enabling iSCSI immediate data for the second virtual iSCSI target may occur during a login negotiation for the second virtual iSCSI target. The enabling iSCSI immediate data for the second virtual iSCSI target may utilize an internal parameter of the second virtual iSCSI target.

In the present disclosure, the methods disclosed may be implemented as sets of instructions or software or firmware readable by a device. Such software may include a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for configuring a data storage server including at least two logically addressable units, wherein the data storage server is configured to be communicatively coupled to at least one initiator device via a network, comprising:
   receiving a login negotiation via a network from an initiator device to access a target of the data storage server, wherein the target of the data storage server has logically addressable units including protected data and logically addressable units including unprotected data;
   creating at least one first virtual device on the data storage server, the at least first virtual device including at least one logically addressable unit including protected data of the target of the data storage server;
   creating at least one second virtual device on the data storage server, the at least one second virtual device including only logically addressable units of the target of the data storage server without protected data;
   disabling support of writes with immediate data from the initiator device to each of the at least one first virtual device on the data storage server, wherein immediate data is data configured to be transferred during a command phase without waiting for a data transfer phase; and
   configuring one or more of the at least one second virtual device on the data storage server to support writes with immediate data from the initiator device.

2. The method of claim 1, wherein one or more of the at least one first virtual device is a virtual Internet Small Computer System Interface (iSCSI) target.

3. The method of claim 1, wherein the at least one first virtual device and the at least one second virtual device each require a separate login for access.

4. The method of claim 1, wherein disabling support of writes with immediate data from the initiator device to each the at least one first virtual device on the data storage server further includes:
   disabling support of writes with immediate data from the initiator device to each the at least one first virtual device on the data storage server during a login negotiation.

5. The method of claim 1, further including:
   enabling data transfers within command phases for the at least one second virtual device.

6. The method of claim 5, wherein the enabling data transfers within command phases for the at least one second virtual device further includes:
   enabling data transfers during a login negotiation for the at least one second virtual device.

7. The method of claim 5, wherein the enabling data transfers within command phases for the at least one second virtual device further includes:
   enabling immediate data support for the at least one second virtual device.

8. The method of claim 1, wherein the at least one first virtual device includes only logically addressable units of the target of the data storage server which include protected data.

9. A system, comprising:
   a data storage server, wherein the data storage server is configured to be communicatively coupled to an initiator device via a network, the data storage server including:
      means for receiving a login negotiation via a network from the initiator device to access a target of the data storage server, wherein the target of the data storage server has logically addressable units including protected data and logically addressable units including unprotected data;
      means for creating at least one first virtual device on the data storage server, the at least first virtual device including at least one logically addressable unit including protected data of the target of the data storage server;
      means for creating at least one second virtual device on the data storage server, the at least one second virtual device including only logically addressable units of the target of the data storage server without protected data;
      means for disabling support of writes with immediate data from the initiator device to each of the at least one first virtual device on the data storage server, wherein immediate data is data configured to be transferred during a command phase without waiting for a data transfer phase; and
      means for configuring one or more of the at least one second virtual device on the data storage server to support writes with immediate data from the initiator device.

10. The system of claim 9, wherein one or more of the at least one first virtual device is a virtual Internet Small Computer System Interface (iSCSI) target.

11. The system of claim 9, wherein the at least one first virtual device and the at least one second virtual device each require a separate login for access.

12. The system of claim 9, wherein the means for disabling support of writes with immediate data from the initiator device to each the at least one first virtual device on the data storage server further includes:
   means for disabling support of writes with immediate data from the initiator device to each the at least one first virtual device on the data storage server during a login negotiation.

13. The system of claim 9, further including:
   means for enabling data transfers within command phases for the at least one second virtual device.

14. The system of claim 13, wherein the means for enabling data transfers within command phases for the at least one second virtual device further includes:
   means for enabling data transfers during a login negotiation for the at least one second virtual device.

15. The system of claim 13, wherein the means for enabling data transfers within command phases for the at least one second virtual device further includes:
   means for enabling immediate data support for the at least one second virtual device.

16. The system of claim 9, wherein the at least one first virtual device includes only logically addressable units of the target of the data storage server which include protected data.

17. A method for configuring an Internet Small Computer System Interface (iSCSI) data storage server including at least two Small Computer System Interface (SCSI) logical units, wherein the iSCSI data storage server is configured to be communicatively coupled to at least one initiator device via a network, comprising:

receiving a login negotiation via a network from an initiator device to access a target of the data storage server, wherein the target of the data storage server has logically addressable units including protected data and logically addressable units including unprotected data;

logically separating the at least two SCSI logical units into a first group and a second group, wherein the first group of the at least two SCSI logical units include protected data, and wherein the second group of the at least two SCSI logical units does not include protected data;

creating a first virtual iSCSI target on the data storage server, the first virtual iSCSI target including the first group of the at least two SCSI logical units;

creating a second virtual iSCSI target on the data storage server, the second virtual iSCSI target including the second group of the at least two SCSI logical units;

disabling iSCSI immediate data for the first virtual iSCSI target on the data storage server, wherein immediate data is data configured to be transferred during a command phase without waiting for a data transfer phase; and configuring the second virtual iSCSI target on the data storage server to support writes with immediate data from the initiator device.

18. The method of claim 17, wherein the first virtual iSCSI target and the second virtual iSCSI target each require separate logins for access.

19. The method of claim 17, further including:
enabling iSCSI immediate data for the second virtual iSCSI target.

20. The method of claim 19, wherein the first virtual iSCSI target and the second virtual iSCSI target each utilize an internal parameter for configuring iSCSI immediate data utilization for the first virtual iSCSI target and the second virtual iSCSI target, wherein the internal parameter is configured to indicate whether to allow data transfers within the command phase.

21. The method of claim 18, wherein the first virtual iSCSI target and the second virtual iSCSI target each are configured for iSCSI immediate data utilization during a login negotiation process.

* * * * *